United States Patent
Lammers

[11] 3,984,511
[45] Oct. 5, 1976

[54] METHOD OF ROTATIONAL MOLDING

[75] Inventor: Sidney G. Lammers, Liverpool, N.Y.

[73] Assignee: Dart Industries Inc., Los Angeles, Calif.

[22] Filed: Feb. 25, 1974

[21] Appl. No.: 446,075

Related U.S. Application Data

[63] Continuation of Ser. No. 146,409, May 24, 1971, abandoned, which is a continuation of Ser. No. 752,388, Aug. 13, 1968, abandoned.

[52] U.S. Cl............................ 264/45.4; 229/1.5 B; 264/45.7; 264/310; 264/DIG. 5
[51] Int. Cl.²..................... B29C 5/04; B29D 27/04
[58] Field of Search............ 264/45.4, 45.7, DIG. 5, 264/310; 229/1.5 B

[56] References Cited
UNITED STATES PATENTS

| 3,255,286 | 6/1966 | Luc-Belmont | 264/51 UX |
| 3,309,439 | 3/1967 | Nonweilber | 264/45.7 X |
| 3,405,202 | 10/1968 | Kjell-Berger | 264/46 X |
| 3,452,390 | 7/1969 | Borcovec | 264/53 X |
| 3,457,205 | 7/1968 | Nonweiler | 264/45.7 X |

*Primary Examiner*—Philip Anderson
*Attorney, Agent, or Firm*—Leigh B. Taylor; Paul R. Wylie; Kenneth J. Hovet

[57] ABSTRACT

The method of forming, by rotational molding, a foamed polystyrene article that has a continuous covering of thermoplastic material such as low density polyethylene. The method requires the utilization of polystyrene beads that contain substantially less than the maximum possible percentage of blowing or expanding agent. A high temperature, low residence time heating step is found to be adequate for the formation of the article.

3 Claims, 3 Drawing Figures

INVENTOR.
SIDNEY G. LAMMERS
BY Paul R. Wylie
ATTORNEY

METHOD OF ROTATIONAL MOLDING

This application is a continuation of application Ser. No. 146,409, filed May 24, 1971 and now abandoned, which in turn is a continuation of co-pending application Ser. No. 752,388, filed Aug. 13, 1968 and now abandoned and claims the Aug. 13, 1968 date, for all material disclosed in the earlier filed application.

This invention relates generally to articles of foamed or expanded polystyrene and to a method of making them. More particularly, the invention relates to the method of forming a foamed polystyrene article having a continuous non-foamed skin covering of thermoplastic material such as polyethylene. According to the method of the invention, the article as herein described is formed by rotational molding techniques.

The recent growth in the number of methods utilizing rotational molding as well as the number of articles made by those methods is attributable to the advantages of rotational molding as a method in making plastic articles. Due to the rotational molding technique, a greater variety of articles having intricate shapes and detailed configurations can be manufactured.

Among the recent patents relating to rotational molding are those issued to Nonweiler (U.S. Pat. No. 3,309,439) and Slapnik (2,989,783). The former of these patents describes a so-called "one-shot" process of manufacturing an expanded polystyrene foam product having a continuous surface covering of denser thermoplastic resin. According to that patent, there is utilized a free-flowing molding composition comprising a compound containing chemically bound water. The Slapnik patent discloses a method of forming a polyethylene covered foamed polystyrene article by rotationally molding polyethylene powder and a bag of thermoplastic material enclosing expandable polystyrene beads.

The foregoing patented methods have not been found to be entirely satisfactory in producing expanded polystyrene foam products having intricate details and good surface conformation.

It is an object of this invention to provide methods of manufacturing a foamed article having a continuous skin covering of a thermoplastic material.

It is a further object of this invention to provide a method of manufacturing such an article with a foamed polystyrene core.

It is still a further object of this invention to provide a method of forming a structurally sound reproducible foamed polystyrene article having a thermoplastic skin covering utilizing a single mold loading step in conjunction with rotational molding techniques.

Another object of this invention is the manufacture by rotational casting of a thermoplastic enclosed foamed polystyrene article using inexpensive and commercially available materials.

Another object is to utilize previously unusable expired polymeric expandable beads.

Yet another object of this invention is the control of rotational casting techniques using expandable polystyrene particles to obtain reproducible parts of a consistent high quality without incorporating water into the molding composition.

According to this invention, there is provided a method of forming an integral part having an internal core of expanded cellular material and a continuous skin of non-cellular thermoplastic material. The method includes the steps of introducing expandable polymeric particulate material and a material capable of forming a continuous skin of thermoplastic into a hollow mold. The expandable material is preferably in particulate free-flowing form such as beads and contains a volatile foaming agent of the type that will expand or foam the material upon heating. Foaming agents are also known in the art as expanding or blowing agents. Examples of such expanding or foaming agents are Pentane, Neopentane, Hexane, Isohexane, Heptane, Isoheptanes, Benzene, Toluene, Methylene Chloride, Trichloroethylene, Dichloroethane, and Trichlorotrifluoroethane. The particulate material is normally expandable to a point of material failure when it contains a high percentage of expanding agent. However, in accordance with this invention, the expandable material used contains an amount of expanding agent substantially less than that present in normal expandable materials and less than three percent by weight of the particulate expandable material prior to expansion. Expandable materials containing less than three percent expanding agent are considered "expired" and unsuitable for usual applications.

The continuous skin forming material is a thermoplastic material which is preferably polymeric in nature and introduced to the mold in the form of a powder. The preferred expandable polymeric material is polystyrene in the form of beads or pellets although other expandable polymeric material such as expandable styrene copolymers are suitable. In the method according to the preferred form of the invention, the mold containing the foregoing materials is closed and rotated multi-axially in a heated zone wherein a temperature sufficient to melt the thermoplastic material and expand the polystyrene beads is obtainable. The thermoplastic powder inside the mold is heated by heat transfer from the mold's surface whereupon it melts and sticks to such surface. Continued heating causes complete melting of the material and initiates expansion of the polystyrene beads. Internal pressure from the expanding polystyrene beads presses the thermoplastic material into the details of the mold's surface. The resulting product is an article having a continuous surface covering of the thermoplastic material and a core of expanded cellular material.

The invention will be described with reference to the accompanying drawing wherein.

Figure 1:
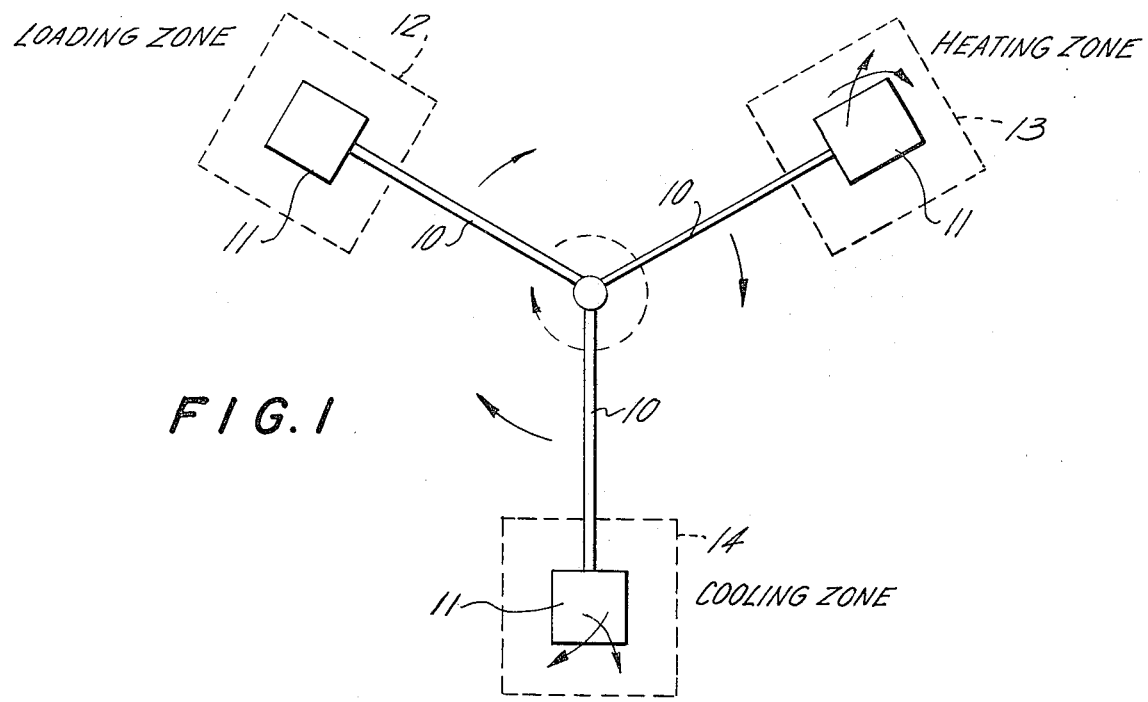
FIG. 1 is a top plan schematic drawing of a rotational casting apparatus of the type used in practicing the invention herein.

With reference to the drawing, a schematic plan view of a common rotational molding apparatus is shown in FIG. 1. The apparatus has three arms 10, equipped with molds, generally designated element 11. The molds can be sequentially cycled through loading zone 12, heating zone 13 and cooling zone 14. In operation, a mold 11 is charged in loading zone 12 with materials of the type previously described. The mold is then introduced into heating zone 13 and multi-axially rotated. Heating may be accomplished through any suitable means. The mold may be provided with a built-in heating means such as steam or electric heating rather than introducing the mold into an oven or other heating area. After a predetermined time in the heating zone, the mold is cycled to cooling zone 14. Finally, the mold is cycled back to the unloading zone where the part is unmolded.

Figure 2:
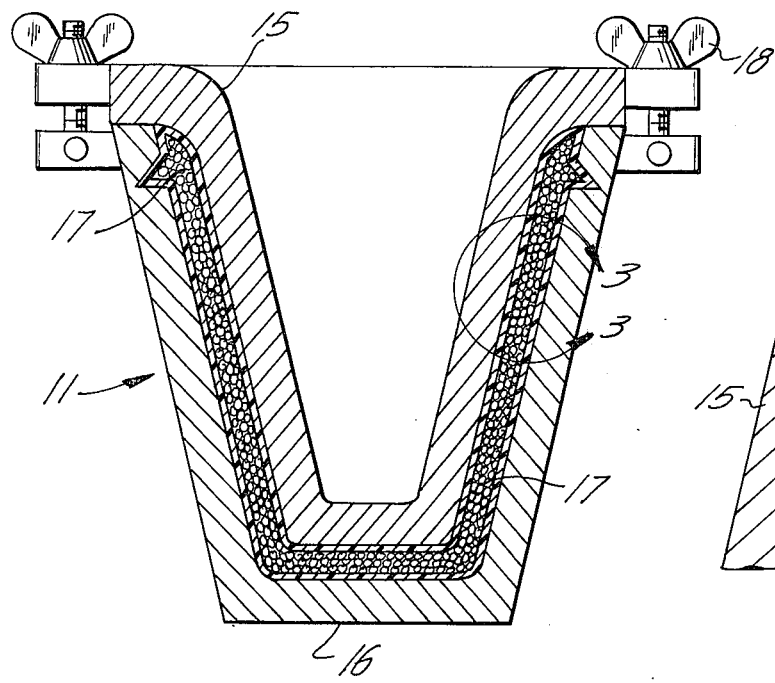
FIG. 2 is a cross-sectional view of a mold depicting a typical product as formed according to the invention; and, FIG. 3 is an enlarged cross-section view taken on line 3—3 of FIG. 2.
Figure 3:
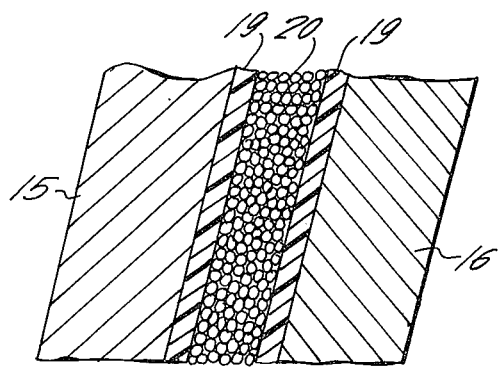

As shown in FIG. 2, a typical mold 11 will have two halves 15 and 16 that are capable of being attached together to form a cavity 17. In charging a mold of the type shown, the materials as described are placed in the concave mold half 16, and the convex mold half 15 is then attached by suitable fastening means such as clamps 18. When cycled through the steps described, the product formed will have a continuous external skin of thermoplastic material 19 and an internal core of expanded cellular material 20 as shown in FIG. 3.

Cooling can be effected by contacting the exterior surface of the mold with forced air, water spray or immersion in water. In some cases, it may not be necessary to cool the mold beyond that which would occur by normal heat transfer at ambient conditions.

The mold can be vented to equalize the pressure during the heating and cooling cycle. Additionally, it must be capable of being closed to resist expansion of the materials. It can be made of any suitable material which will transfer heat to the article forming materials and is therefore preferably made of metallic substance such as aluminum.

The thermoplastic material can be any suitable material which will melt without decomposition at a temperature suitable for expansion of the expandable material to form a continuous skin layer. The thermoplastic material must be compatable with the expandable material. Such materials include polymeric materials such as linear and low density polyethylene, polypropylene, high impact styrene, acrylonitrile-butadiene-styrene copolymer, polyacetals, nylon, polyacrylates, polycarbonates, polyphenylene oxide, polyethers, polyvinyl chloride, and polybutyrates. Aliphatic waxes and similar materials can also be used. It is presently preferred to utilize low density powdered polyethylene as the material to form the external skin covering for the article. It has been found that generally the finer powders will give the best results in providing an article with good surface conformity and corners as well as good continuity on the article surface. To this end, it is preferred to use particles that are finer than −35mesh.

The polystyrene or other expandable pellets or beads can be of any presently commerically available grade porous beads which will expand upon heating. However, according to the invention the pellets should have a percentage of volatile expanding or "blowing" agent that is less than three percent. When beads expand that contain a normally high percentage of expanding agent the walls of the individual beads will stretch to the point of breaking usually resulting in the collapse of the beads. The result will be that the final thermoplastic enclosed polystyrene article has sink marks and depressions and a general poor surface conformity. To eliminate these problems, the beads utilized according to the invention contain an amount of expanding agent substantially less than that contained in freshly steeped beads. Normally, expandable beads that are steeped in an n-heptane expanding agent contain from about 5–5½ expanding agent by weight. However, it has been found that beads containing from about 1.5 to less than about 3 percent by weight blowing agent are desirable for the foregoing method. Such beads are commonly considered to be "expired" after the blowing agent has decreased to that amount since they are no longer useful for their usual intended use such as the making of polystyrene cups. To be useful, these beads usually require a rejuvenation process which is extremely expensive.

Although the foregoing preferred range of about 1.5% to less than 3% by weight blowing agent is desirable for forming parts and articles according to the invention the limits may be broadened with varying results for certain applications. As a practical matter, the minimum percentage of blowing agent is limited by the amount that will no longer cause expansion of the beads. The maximum percentage of blowing agent is that which will expand the beads to the point of material failure and cause undesirable sink marks and depressions in the resulting article.

A mixture of "expired" and "unexpired" beads can be used. Thus, a percentage of beads containing substantially the maximum amount of volatile expanding agent possible can be used along with a percentage of beads containing less than this maximum amount in an admixture. Of course, the percentage of the "expired" and "unexpired" beads would require adjustment to form a suitable expandable inner core layer for any particular application.

After the polymeric beads and powdered thermoplastic material are introduced into a mold, the mold is heated to cause melting of the powder material and expansion of the beads. Although molding temperatures ranging from about 250°F. to about 850°F. can be used without deleterious effects it is presently preferred to use temperatures in the range from about 275°F. to about 300°F. Relatively high temperatures can also be used to obtain a reduced cycle time and better manufacturing efficiency. The higher temperatures cause the thermoplastic skin covering of the resultant article to form quickly in the mold. Due to the reduced residence time of the mold in the high heat zone sufficient heat is not transferred from the mold to cause over expansion and collapse of the beads. When the mold is removed from the high heat zone, continued heat transfer from the mold expands the beads, even though the mold has entered the cooling zone.

With the foregoing temperatures a residence time in the heat zone of from about 5 to about 25 minutes can be used. Residence times in the lower portion of this range are preferred for the high heat technique as set out above.

The following Specific Examples are illustrative of considerations under which the invention can be practiced.

EXAMPLE 1

A two-gallon container was molded according to the process of this invention. Thirty ounces of polyethylene of a density of 0.918 and in the form of a powder of −35 mesh was introduced into a mold of the type shown in FIG. 2 along with 8¾ oz. of commerical grade polystyrene beads which were determined to contain about 1.5% by weight n-heptane as an expanding agent. 1¼ oz. of commerical grade polystyrene beads containing about 3.5% by weight n-heptane as an expanding agent was also introduced into the mold. The mold was rotated multi-axially at a ratio of 4 revolutions in one direction to 1 revolution in the direction of the other axis of rotation. The mold thus rotating was introduced into the heating zone of a rotational molding apparatus for about 15 minutes at a temperature of about 320°F. The mold was then removed from the heating zone and while rotation was continuing, it was permitted to cool for 8 minutes in the cooling zone at ambient temperature followed by 6 minutes of water cooling and an additional 2 minutes ambient cooling. The resulting article was found to have well defined surface details and good surface conformity without the presence of sink marks.

EXAMPLE 2

A product similar to the product made in Example 1 was made using similar steps with the following changes: 24 ounces of polyethylene powder and 8 ounces of polystyrene beads containing about 1.5% by weight expanding agent were used. A cycle time of 10 minutes was used at a heating temperature of 300°F. The mold was cooled for 7 minutes at ambient temperature, 2 minutes with water and 1 minute by a fan. The resulting product was very good in all respects including good surface detail and conformity and the absence of sink marks.

EXAMPLE 3

The same product as in the foregoing examples was made using steps similar to Example 1 with the following differences: 24 ounces of polyethylene powder and 10 ounces polystyrene beads havin about 2.7% by weight expanding agent were used. The cycle time was 10 minutes at a heating temperature of 300°F. Cooling of 7 minutes at ambient temperature, 1 minute water spray and 1 minute fan forced air was used. The walls of the resulting product uniformly dense and well confined.

EXAMPLE 4

The same product as in Examples 1 through 3 was made usin steps similar to Example 1 with the following changes: 26 ounces of polyethylene powder and 8 ounces of polystyrene beads containing about 1.5% by weight expanding agent were used. A cycle time of 6 minutes at a heating temperature of 700°F. was used. Cooling was effected by allowing the mold to stand for 5 minutes at ambient temperature followed by 1 minute for cooling. The resulting product had good surface conformity and evenly distributed expanded beads.

EXAMPLE 5

Twenty-eight grams of polyethylene powder and twelve grams of unexpanded polystyrene beads containing about 6% blowing agent are introduced into a box mold. No water is added in any form. The mold is rotated about two axis at 270°F for 8 minutes. The resulting part has a thin wall and a spongy foam interior.

EXAMPLE 6

The process for Example 5 is followed except the polystyrene beads contain slightly less than 3 percent blowing agent. The resulting part has a wood foam interior and a fairly good exterior wall.

EXAMPLE 7

About 64 grams of polyethylene powder and about 30 grams of unexpanded expandable polystyrene beads containing about 6 percent blowing agent are introduced into a bowl mold. No water is added. The mold is rotated about two axes at a temperature of about 250°F for 8 minutes. The resulting part has a poor surface but the inside foam is satisfactory.

EXAMPLE 8.

The process of Example 7 is followed except the beads contain slightly less than 3 percent blowing agent. The resulting part has a superior surface and the inside foam is satisfactory.

The foregoing Specific Examples illustrate the utility of the invention in forming thermoplastic enclosed foamed polystyrene articles.

The method according to the invention, as applied to an article having a foamed polystyrene core and a continuous thermoplastic skin surface, can be used to form articles of varying wall thickness. In practice, articles of a wall thickness of up to 2 inches have been successfully formed without a noticeable lack in quality or the appearance of sink marks in the surface. The wall thickness for articles formed according to the invention will range from a thickness where the self-insulation properties of the beads causes serious density and structural defects due to insufficient heat transfer to expand the beads in the center of the core portion to the thickness of one of the beads.

Articles made according to the invention are limited in size only by the limitations of the basic rotational molding equipment available.

In equipment for rotational molding that is currently commercially available, provision is made for changing the ratio of rotation in the biaxially rotatable equipment. Depending upon the size and configuration of any given article made according to the process, the ratio of rotation can be adjusted to optimize the formation of the article. In an article of the type shown in FIG. 2, a ratio of about 4 revolutions in one direction to about 1 revolution in the complimentary biaxial direction is preferred.

Variation and modification of the foregoing methods are possible within the scope of the invention as defined by the following claims.

What is claimed is:
1. The method of forming an integral three dimensional product having an internal core of expanded resinous material and a continuous surface layer of resinous thermoplastic material comprising:
    a. introducing into a hollow mold a composition comprising a powdered resinous thermoplastic material and an unexpanded resinous polymeric particulate material impregnated with up to less than 3% by weight of an organic volatile liquid blowing agent which is such to just cause expansion of said resinous particulate material upon heating thereof, said powdered resinous thermoplastic material having a melting point temperature which will cause expansion of said particulate material; and
    b. heating the mold to a temperature which will cause expansion of said resinous particulate material, while rotating same whereby the powdered resinous thermoplastic material will be formed on the inside surface of the mold as a continuous surface layer and the expandable resinous particulate material will expand to form a cellular core of expanded resinous material.
2. The method of claim 1 wherein said particulate material comprises expandable polystyrene beads.
3. the method of claim 1 wherein said resinous polymeric thermoplastic polymer is low density polyethylene.

* * * * *